US011095850B2

United States Patent
Horio et al.

(10) Patent No.: US 11,095,850 B2
(45) Date of Patent: Aug. 17, 2021

(54) BIDIRECTIONAL VIDEO COMMUNICATION SYSTEM AND COMMUNICATION CONTROL DEVICE

(71) Applicant: PANASONIC INTELLECTUAL PROPERTY MANAGEMENT CO., LTD., Osaka (JP)

(72) Inventors: Kazuyuki Horio, Tokyo (JP); Issei Ikezaki, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/975,598

(22) PCT Filed: Feb. 7, 2019

(86) PCT No.: PCT/JP2019/004507
§ 371 (c)(1),
(2) Date: Aug. 25, 2020

(87) PCT Pub. No.: WO2019/163546
PCT Pub. Date: Aug. 29, 2019

(65) Prior Publication Data
US 2020/0396417 A1 Dec. 17, 2020

(30) Foreign Application Priority Data
Feb. 26, 2018 (JP) .............................. JP2018-032227

(51) Int. Cl.
*H04N 7/14* (2006.01)
*G06K 9/00* (2006.01)
*H04M 3/51* (2006.01)

(52) U.S. Cl.
CPC ......... *H04N 7/147* (2013.01); *G06K 9/00355* (2013.01); *G06K 9/00375* (2013.01); *H04M 3/5133* (2013.01)

(58) Field of Classification Search
None
See application file for complete search history.

(56) References Cited

U.S. PATENT DOCUMENTS 5,239,373 A * 8/1993 Tang .................. H04N 1/00283
   348/14.01
5,774,663 A * 6/1998 Randle .................. G06Q 20/18
   348/E7.079

(Continued)

FOREIGN PATENT DOCUMENTS

EP  3316573 A1 * 5/2018 ............. H04N 7/147
JP  2005-051554  2/2005

(Continued)

OTHER PUBLICATIONS

International Search Report issued in International Pat. Appl. No. PCT/JP2019/004507, dated Mar. 19, 2019, along with an English translation thereof.

*Primary Examiner* — Quoc D Tran
(74) *Attorney, Agent, or Firm* — Greenblum & Bernstein, P.L.C.

(57) ABSTRACT

A communication system includes an operator-side edge terminal connected to an operator terminal, wherein the operator-side edge terminal includes an I/O device configured for performing input and output of data to and from the operator terminal, a communication device for communicating with the kiosk terminal or a user-side edge terminal connected to the kiosk terminal via a network, and a controller, and wherein the controller is configured to perform a connection control for connection to the kiosk terminal or the user-side edge terminal and to perform a (Continued)

video transmission control of real-time transmission of a frontal video of the operator and a video of hands of the operator, both videos being shot by the operator terminal, and a frontal video of the user and a video of hands of the user, both videos being shot by the kiosk terminal.

4 Claims, 8 Drawing Sheets

(56) References Cited

U.S. PATENT DOCUMENTS

| | | | |
|---|---|---|---|
| 6,628,755 B2* | 9/2003 | Shimada | G06Q 40/02 |
| | | | 379/142.01 |
| 9,118,786 B2* | 8/2015 | Nakamura | H04N 7/144 |
| 10,122,966 B2* | 11/2018 | Horio | G06F 3/04883 |
| 10,362,271 B2* | 7/2019 | Katsuyama | H04N 7/144 |
| 2006/0181607 A1* | 8/2006 | McNelley | H04N 7/144 |
| | | | 348/14.08 |
| 2010/0238265 A1* | 9/2010 | White | H04N 7/144 |
| | | | 348/14.16 |
| 2011/0305275 A1 | 12/2011 | Eleftheriadis et al. | |
| 2018/0152668 A1* | 5/2018 | Horio | H04N 7/15 |

FOREIGN PATENT DOCUMENTS

| JP | 2015-097416 | 5/2015 |
|---|---|---|
| JP | 2017-010467 | 1/2017 |

* cited by examiner

Fig.6
(A-1)
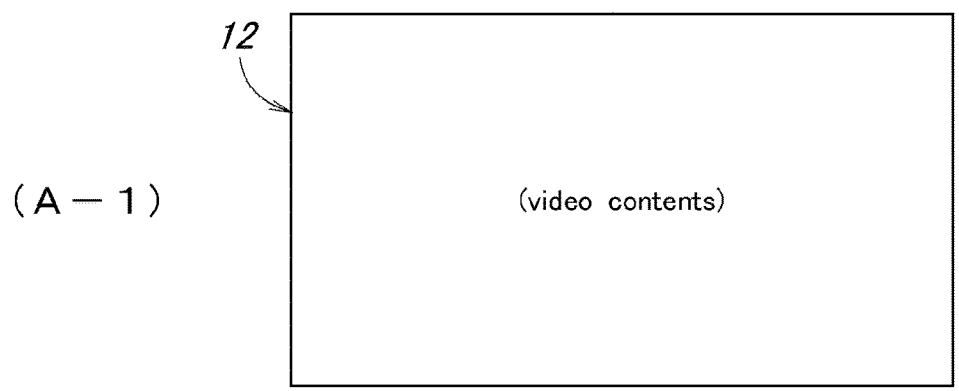
(A-2)
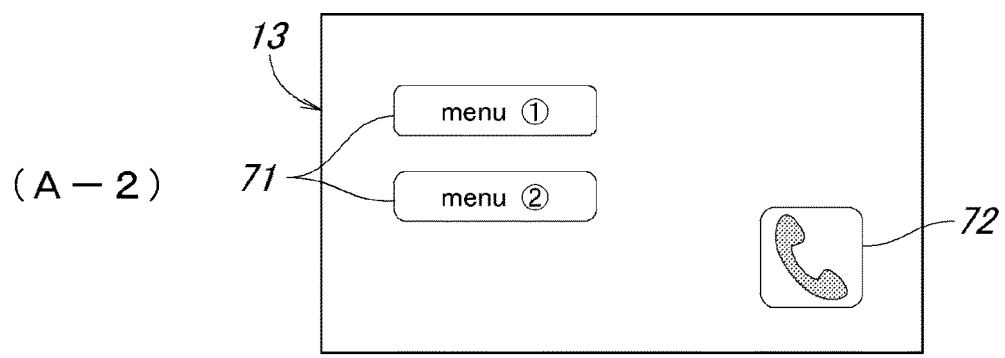
(B-1)
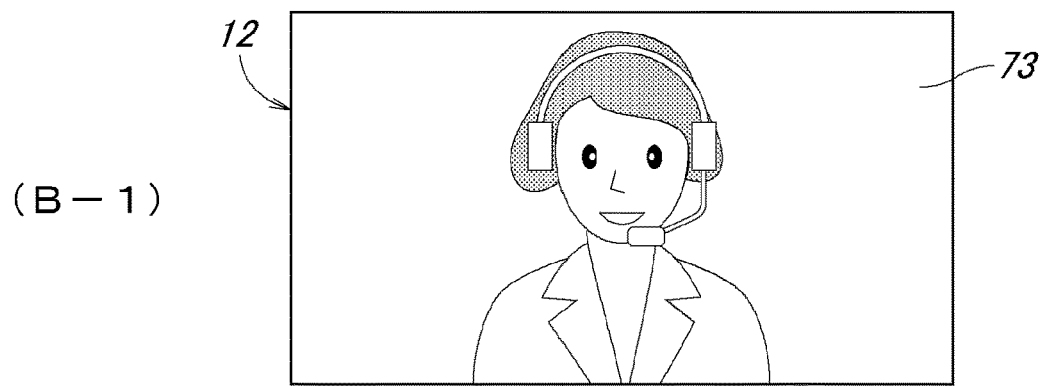
(B-2)
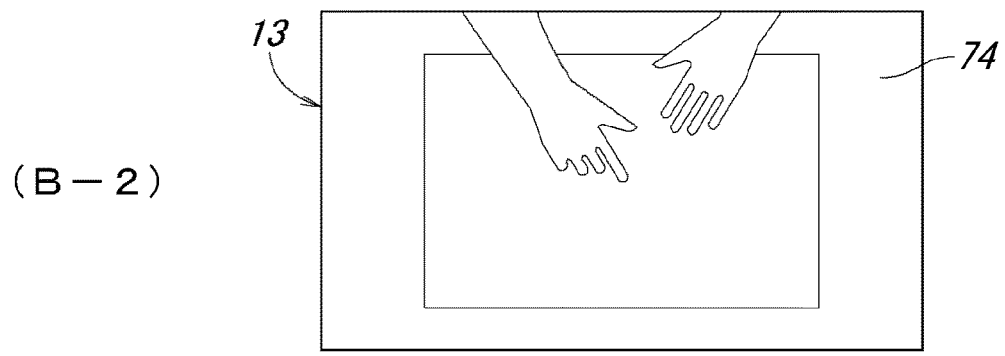

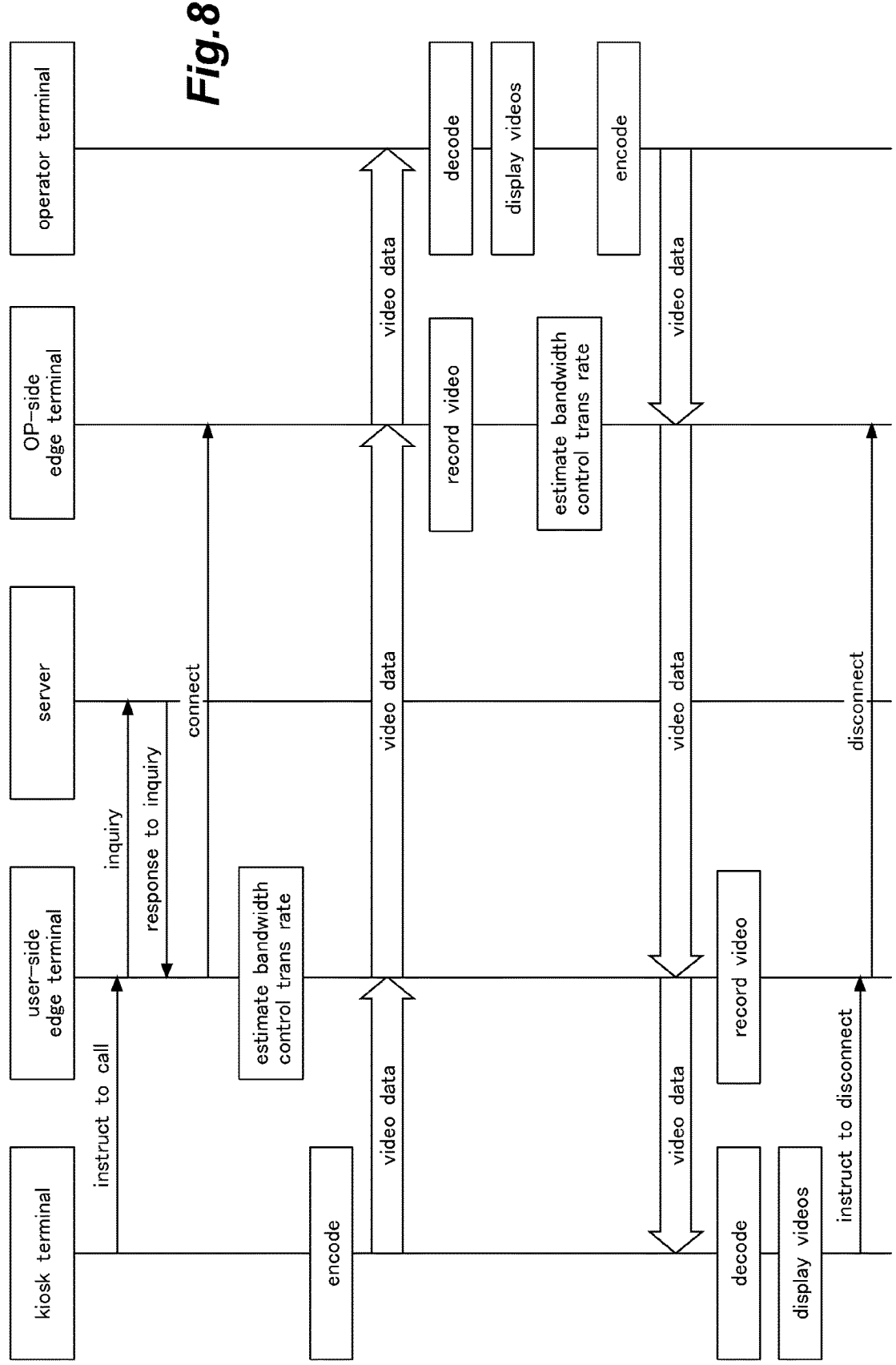

BIDIRECTIONAL VIDEO COMMUNICATION SYSTEM AND COMMUNICATION CONTROL DEVICE

TECHNICAL FIELD

The present invention relates to a bidirectional video communication system for bidirectional communication between a kiosk terminal and an operator terminal, the system being configured to bidirectionally transmit a video of a user who operates the kiosk terminal and a video of an operator who operates the operator terminal between the kiosk terminal and the operator terminal, and an operator terminal used therein.

BACKGROUND ART

In recent years, bidirectional video communication systems, which are configured to bidirectionally transmit videos of a plurality of remotely-located persons to and from one another, have been widely used. Meanwhile, kiosk terminals, which are configured for providing services such as guidance services (providing various types of information) and teller services at financial institutions, taking the place of human operators, are also widely used. Thus, by building up a bidirectional video communication system for communication between such a kiosk terminal and an operator terminal operated by an operator, the operator can provide a face-to-face response to a user, which improves quality of services provided by the kiosk terminal.

Known such technologies directed to a bidirectional video communication system built in a kiosk terminal include a system configured such that the system's operation mode can be switched between a first operation mode and a second operation mode, wherein, in first operation mode, a customer terminal displays a video of an operator on a monitor so that the operator can provide response services to a user through video and voice, and wherein, in the second operation mode, the customer terminal displays on the monitor a video image of an avatar with lips that move in response to the movement of the operator's lips, the operator being detected from a sound of the operator's voice, so that the operator can provide response services to a user only by voice (Patent Document 1). In this prior art, when a connection request is transmitted from the customer terminal to an operator terminal, the operator terminal displays contents according to a result of personal authentication so that the operation mode can be switched based on the displayed contents.

PRIOR ART DOCUMENT(S)

Patent Document(s)

Patent Document 1: JP2005-051554A

SUMMARY OF THE INVENTION

Task to be Accomplished by the Invention

Meanwhile, a call center accommodates a necessary number of operator terminals to provide telephone reception services to users using voice over the telephone, the number of the operator terminals being determined based on an expected in-call volume from the customers. However, when a call center provides face-to-face response services to a user using video and voice through bidirectional video communications, it has been very costly to provide the call center with dedicated operator terminals usable not only for telephone reception services, but also face-to-face response services. Therefore, there is a need for a technology by which a generally-used operator terminal used for telephone reception services can be made also usable for face-to-face response services according to an amount of time in providing such services, so that the operator terminal can be used as necessary for either of telephone reception services and face-to-face response services.

However, the above-described prior art does not take into account any configuration which enables a generally-used operator terminal commonly used for telephone reception services, to be also usable for face-to-face response services. Thus, there has been a problem that a generally-used operator terminal for telephone reception services cannot be made also usable for face-to-face response services.

The present invention has been made in view of such problems of the prior art, and a primary object of the present invention is to provide a bidirectional video communication system and an operator terminal used therein, which enable a generally-used operator terminal for providing telephone reception services through responding to a user only using voice over a telephone, to be made also usable for providing face-to-face reception services through responding to the user using video and voice.

Means to Accomplish the Task

An aspect of the present invention provides a bidirectional video communication system for communication between a kiosk terminal and an operator terminal, the system being configured to bidirectionally transmit a video of a user who operates the kiosk terminal and a video of an operator who operates the operator terminal between the kiosk terminal and the operator terminal, the system comprising: an operator-side communication control device connected to the operator terminal, wherein the operator-side communication control device comprises: an I/O device configured for performing input and output of data to and from the operator terminal; a communication device for communicating with the kiosk terminal or a user-side communication control device connected to the kiosk terminal via a network; and a controller, and wherein the controller is configured to perform a connection control for connection to the kiosk terminal or the user-side communication control device and to perform a video transmission control of real-time transmission of a frontal video of the operator and a video of hands of the operator, both videos being shot by the operator terminal, and a frontal video of the user and a video of hands of the user, both videos being shot by the kiosk terminal, to and from the kiosk terminal or the user-side communication control device.

Another aspect of the present invention provides a communication control device connected to an operator terminal for bidirectionally transmitting a video of a user who operates a kiosk terminal and a video of an operator who operates the operator terminal to and from the kiosk terminal, the device comprising: an I/O device configured for performing input and output of data to and from the operator terminal; a communication device for communicating with the kiosk terminal or a user-side communication control device connected to the kiosk terminal via a network; and a controller, and wherein the controller is configured to perform a connection control for connection to the kiosk terminal or the user-side communication control device and to perform a video transmission control of real-time transmission of a frontal video of the operator and a video of hands of the operator, both videos being shot by the operator terminal, and a frontal video of the user and a video of hands of the user, both videos being shot by the kiosk terminal, to and from the kiosk terminal or the user-side communication control device.

In this configuration, since a communication control required for bidirectional communications is performed by a communication control device, a generally-used operator terminal used for providing telephone reception services can be made also usable for providing face-to-face reception services by connecting the generally-used operator terminal to the communication control device.

Effect of the Invention

According to the present invention, since a communication control required for bidirectional communications is performed by a communication control device, a generally-used operator terminal used for providing telephone reception services can be made also usable for providing face-to-face reception services by connecting the generally-used operator terminal to the communication control device.

A second aspect of the present invention is the bidirectional video communication system of the first aspect, further comprising a plurality of operator terminals, wherein the plurality of operator terminals are connected to the operator-side communication control device.

In this configuration, since the plurality of operator terminals share the common communication control device, costs are reduced.

A third aspect of the present invention is the bidirectional video communication system of the first or second aspect, wherein the operator-side communication control device performs a bandwidth estimation for estimating an available bandwidth for communication between the kiosk terminal and the user-side communication control device, and performs a transmission rate control for controlling a transmission rate depending on the estimated available bandwidth.

In this configuration, the system can reliably perform real-time transmission of videos between the terminals.

BRIEF DESCRIPTION OF THE DRAWINGS

FIG. 6 is an explanatory diagram showing screens displayed on the kiosk terminal 1;

FIG. 8 is a sequence diagram showing an operation procedure of operations performed by the system.

Figure 1:
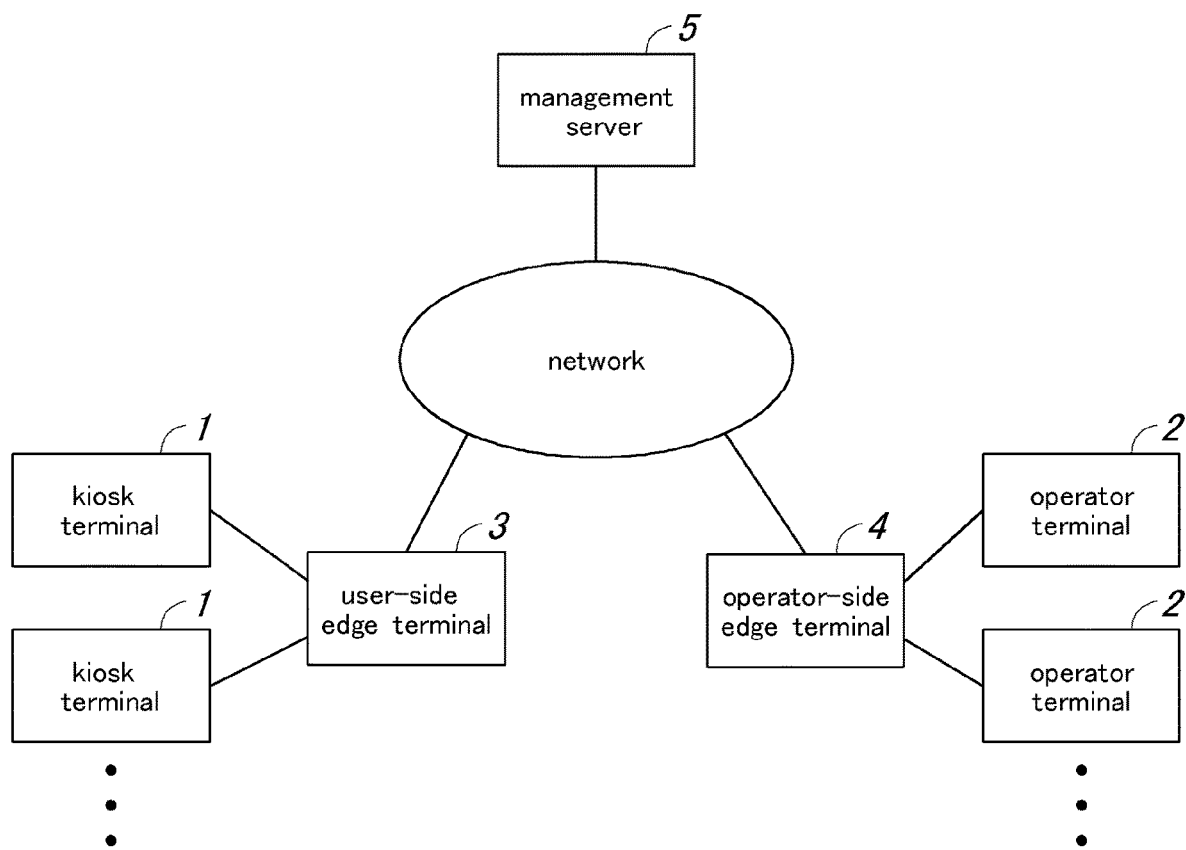
FIG. 1 is a diagram showing a general configuration of a bidirectional video communication system according to an embodiment of the present invention.

A fourth aspect of the present invention is the bidirectional video communication system of any one of the first to third aspects, further comprising: a server device configured to manage connection information used for connecting the operator-side communication control device to the kiosk terminal and the user-side communication control device, and to provide the connection information to the operator-side communication control device, wherein the operator-side communication control device is configured to acquire the connection information from the server device and perform the connection control.

This configuration enables the operator-side communication control device to be connected to the kiosk terminal or the user-side communication control device via the Internet.

A fifth aspect of the present invention is a bidirectional video communication system for communication between a kiosk terminal and an operator terminal, the system being configured to bidirectionally transmit a video of a user who operates the kiosk terminal and a video of an operator who operates the operator terminal between the kiosk terminal and the operator terminal, the system comprising: a user-side communication control device connected to the operator terminal, wherein the user-side communication control device comprises: an I/O device configured for performing input and output of data to and from the kiosk terminal; a communication device for communicating with the operator terminal or an operator-side communication control device connected to the operator terminal via a network; and a controller, and wherein the controller is configured to perform a connection control for connection to the operator terminal or the operator-side communication control device and to perform a video transmission control of real-time transmission of a frontal video of the user and a video of hands of the user, both videos being shot by the kiosk terminal, and a frontal video of the operator and a video of hands of the operator, both videos being shot by the operator terminal, to and from the operator terminal or the operator-side communication control device.

DESCRIPTION OF THE PREFERRED EMBODIMENT(S)

A first aspect of the present invention made to achieve the above-described object is a bidirectional video communication system for communication between a kiosk terminal and an operator terminal, the system being configured to bidirectionally transmit a video of a user who operates the kiosk terminal and a video of an operator who operates the operator terminal between the kiosk terminal and the operator terminal, the system comprising: an operator-side communication control device connected to the operator terminal, wherein the operator-side communication control device comprises: an I/O device configured for performing input and output of data to and from the operator terminal; a communication device for communicating with the kiosk terminal or a user-side communication control device connected to the kiosk terminal via a network; and a controller, and wherein the controller is configured to perform a connection control for connection to the kiosk terminal or the user-side communication control device and to perform a video transmission control of real-time transmission of a frontal video of the operator and a video of hands of the operator, both videos being shot by the operator terminal, and a frontal video of the user and a video of hands of the user, both videos being shot by the kiosk terminal, to and from the kiosk terminal or the user-side communication control device.

In this configuration, since a communication control required for bidirectional communications is performed by a communication control device, a generally-used kiosk terminal can be made also usable for bidirectional communication by connecting the generally-used kiosk terminal to the communication control device.

A sixth aspect of the present invention is the bidirectional video communication system of the fifth aspect, further comprising a plurality of kiosk terminals, wherein the plurality of kiosk terminals are connected to the user-side communication control device.

In this configuration, since the plurality of operator terminals share the common communication control device, costs are reduced.

A seventh aspect of the present invention is s the bidirectional video communication system of the fifth or sixth aspect, wherein the user-side communication control device performs a bandwidth estimation for estimating an available bandwidth for communication between the operator terminal and the operator-side communication control device, and performs a transmission rate control for controlling a transmission rate depending on the estimated available bandwidth.

In this configuration, the system can reliably perform real-time transmission of videos between the terminals.

An eighth aspect of the present invention is the bidirectional video communication system of any one of the fifth to seventh aspects, further comprising: a server device configured to manage connection information used for connecting the user-side communication control device to the operator terminal and the operator-side communication control device, and to provide the connection information to the user-side communication control device, wherein the user-side communication control device is configured to acquire the connection information from the server device and perform the connection control.

This configuration enables the user-side communication control device to be connected to the operator terminal or the operator-side communication control device via the Internet.

A ninth aspect of the present invention is a communication control device connected to an operator terminal for bidirectionally transmitting a video of a user who operates a kiosk terminal and a video of an operator who operates the operator terminal to and from the kiosk terminal, the device comprising: an I/O device configured for performing input and output of data to and from the operator terminal; a communication device for communicating with the kiosk terminal or a user-side communication control device connected to the kiosk terminal via a network; and a controller, and wherein the controller is configured to perform a connection control for connection to the kiosk terminal or the user-side communication control device and to perform a video transmission control of real-time transmission of a frontal video of the operator and a video of hands of the operator, both videos being shot by the operator terminal, and a frontal video of the user and a video of hands of the user, both videos being shot by the kiosk terminal, to and from the kiosk terminal or the user-side communication control device.

In this configuration, in the same manner as the first aspect, since a communication control required for bidirectional communications is performed by a communication control device, a generally-used operator terminal used for providing telephone reception services can be made also usable for providing face-to-face reception services by connecting the generally-used operator terminal to the communication control device.

A tenth aspect of the present invention is a communication control device connected to a kiosk terminal for bidirectionally transmitting a video of a user who operates the kiosk terminal and a video of an operator who operates an operator terminal to and from the operator terminal, the device comprising: an I/O device configured for performing input and output of data to and from the kiosk terminal; a communication device for communicating with the operator terminal or an operator-side communication control device connected to the operator terminal via a network; and a controller, and wherein the controller is configured to perform a connection control for connection to the operator terminal or the operator-side communication control device and to perform a video transmission control of real-time transmission of a frontal video of the user and a video of hands of the user, both videos being shot by the kiosk terminal, and a frontal video of the operator and a video of hands of the operator, both videos being shot by the operator terminal, to and from the operator terminal or the operator-side communication control device.

In this configuration, in the same manner as the fifth aspect, since a communication control required for bidirectional communications is performed by the communication control device, a generally-used kiosk terminal can be made also usable for bidirectional communication by connecting the generally-used kiosk terminal to the communication control device.

Embodiments of the present invention will be described below with reference to the drawings.

FIG. 1 is a diagram showing a general configuration of a bidirectional video communication system according to an embodiment of the present invention.

The bidirectional video communication system includes kiosk terminals 1, operator terminals 2, a user-side edge terminal 3 (communication control device), an operator-side edge terminal 4 (communication control device), and a management server 5.

A plurality of kiosk terminals 1 can be connected to the user-side edge terminal 3. The operator terminals 2 are connected to the operator-side edge terminal 4. The user-side edge terminal 3 and the operator-side edge terminal 4 are connected to each other via a network such as the Internet, a VPN (Virtual Private Network) or an intranet.

The kiosk terminal 1 is installed in various facilities and adapted to be operated by a user. The kiosk terminal 1 is configured to transmit a video of the user to the operator terminal 2 via the user-side edge terminal 3 and the operator-side edge terminal 4 and to display a video of an operator received from the operator terminal 2 via the operator-side edge terminal 4 and the user-side edge terminal 3.

The operator terminal 2 is installed in a facility such as a call center where operators who respond to users are present at all times, and is adapted to be operated by an operator. The operator terminal 2 is configured to transmit a video of an operator to the kiosk terminal 1 via the operator-side edge terminal 4 and the user-side edge terminal 3 and display a video of a user received from the kiosk terminal 1 via the user-side edge terminal 3 and the operator-side edge terminal 4.

When operator terminals 2 are installed in a call center, the operator terminals 2 are used for telephone reception services. In this case, operator terminals 2 which are in an non-used state; that is, which are not used for telephone reception services are connected to the operator-side edge terminal 4 and used to provide face-to-face services to a user through video and voice. When operator terminals 2 are used for telephone reception services, the operator terminals 2 are connected to an ACD (Automatic Call Distribution) management server (not shown).

The user-side edge terminal 3 is installed in a facility where the kiosk terminals 1 are installed and transfers videos between the kiosk terminals 1 and the operator terminals 2.

The operator-side edge terminal 4 is installed in a facility where the operator terminals 2 are installed and transfers videos between the kiosk terminals 1 and the operator terminals 2.

The management server 5 manages connection information for connecting the operator-side edge terminal 4 to the user-side edge terminal 3 and provides the connection information to the operator-side edge terminal 4, the management server 5 also manages connection information for connecting the user-side edge terminal 3 to the operator-side edge terminal 4 and provides the connection information to the user-side edge terminal 3. Specifically, the management server 5 serves as a function of an ICE (Interactive Connectivity Establishment) server for managing connection information for NAT (Network Address Translation) traversal, and also as a signaling server for transferring connection information between the operator-side edge terminal 4 and the user-side edge terminal 3.

When the user-side edge terminal 3 and the operator-side edge terminal 4 perform communication with each other via a dedicated line such as an intranet or VPN, the user-side edge terminal 3 and the operator-side edge terminal 4 hold connection information in themselves, and thus a management server 5 is not necessary.

The kiosk terminal 1 can provide various services. For example, the kiosk terminal 1 can be disposed in a lobby of a transportation facility such as an airport to thereby provide services such as providing information on nearby sightseeing spots, information on floors in the facility, and information on nearby accommodation facilities. The kiosk terminal 1 can be disposed in a branch of a financial institution such as a bank to thereby provide various services provided at a counter in the branch, such as consulting services associated with opening an account, financial transactions and customer loan. The kiosk terminal 1 is disposed at a reception counter of an accommodation facility such as a hotel to thereby provide various receptionist's services provided by a staff member (concierge). Moreover, the kiosk terminal 1 can be disposed in the entrance lobby of an apartment such as a condominium to thereby provide various services provided by a building janitor.

In this manner, the kiosk terminal 1 can constantly provide various services in place of a person in charge, and thus it becomes possible to improve the quality of services. In addition, since an operator can take charge of a plurality of facilities, it becomes possible to downsize employees.

The kiosk terminal 1 and the operator terminal 2 perform bidirectional communication with each other, transmitting a video of a user and that of an operator to each other. In addition, the kiosk terminal 1 and the operator terminal 2 perform bidirectional communication with each other, transmitting to each other operation information which the user and the operator enter on the kiosk terminal 1 and the operator terminal 2, respectively.

In particular, the terminals can transmit confidential information (for example, personal information such as user's name and address, or a financial institution account number) to each other. For transmission of such confidential information, since a service provider already provides a highly secure network, the terminals may be configured to transmit confidential information other than video via the existing highly secure network while transmitting video via a different network. In this configuration, a necessary security for transmission of confidential information is ensured by using the existing network, whereas video contents, which require a large amount of communication in transmission, can be transmitted over a different network, thereby preventing an increase in the load on the existing network.

Figure 2:
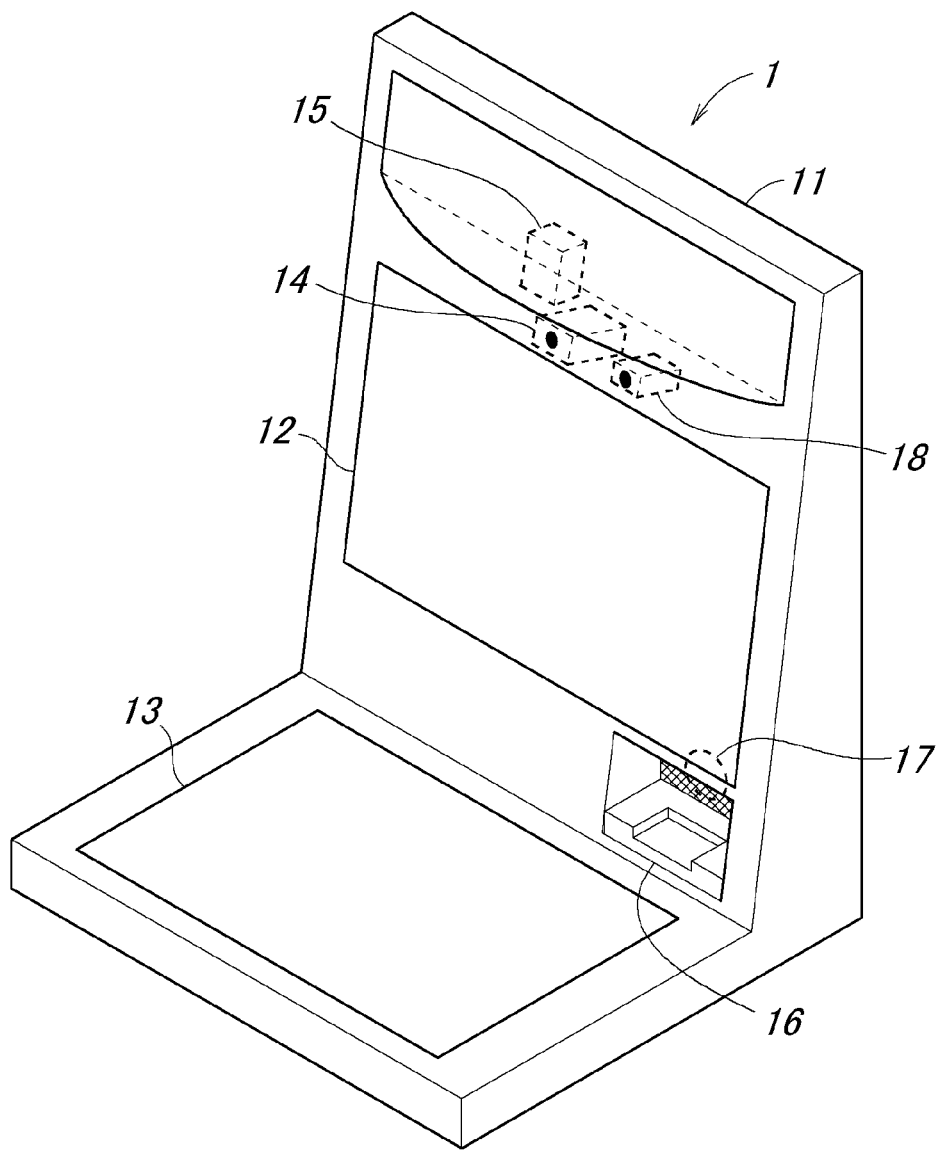
FIG. 2 is a perspective view showing a kiosk terminal 1.

Next, the kiosk terminal 1 will be described. FIG. 2 is a perspective view showing a kiosk terminal 1.

The kiosk terminal 1 includes a housing 11, a front-facing monitor 12, an upward-facing monitor 13, a front-facing camera 14, a downward-facing camera 15, an IC card reader 16, a speaker 17, and a microphone 18.

The front-facing monitor 12 is arranged with its screen facing forward, and the upward-facing monitor 13 is arranged with its screen facing upward. In addition, the upward-facing monitor 13 includes a touchscreen so that users can operate the touchscreen to invoke actions.

The front-facing camera 14 is used to shoot a video of a user's upper body including the user's face from front. The downward-facing camera 15 is used to shoot a video of where the user's hands are placed; that is, shoot a video of the user's hand placed on the upward-facing monitor 13 from above. The user points a finger on the screen of the upward-facing monitor 13, and this situation is shot by the downward-facing camera 15.

The IC card reader 16 reads an IC card carried by the user.

The speaker 17 outputs voice of the operator. The microphone 18 picks up a sound of the user's voice.

The kiosk terminal 1, which is configured this way, is placed on a base such as a counter so that a user can operate the kiosk terminal 1 while sitting on the chair or standing.

Figure 3:
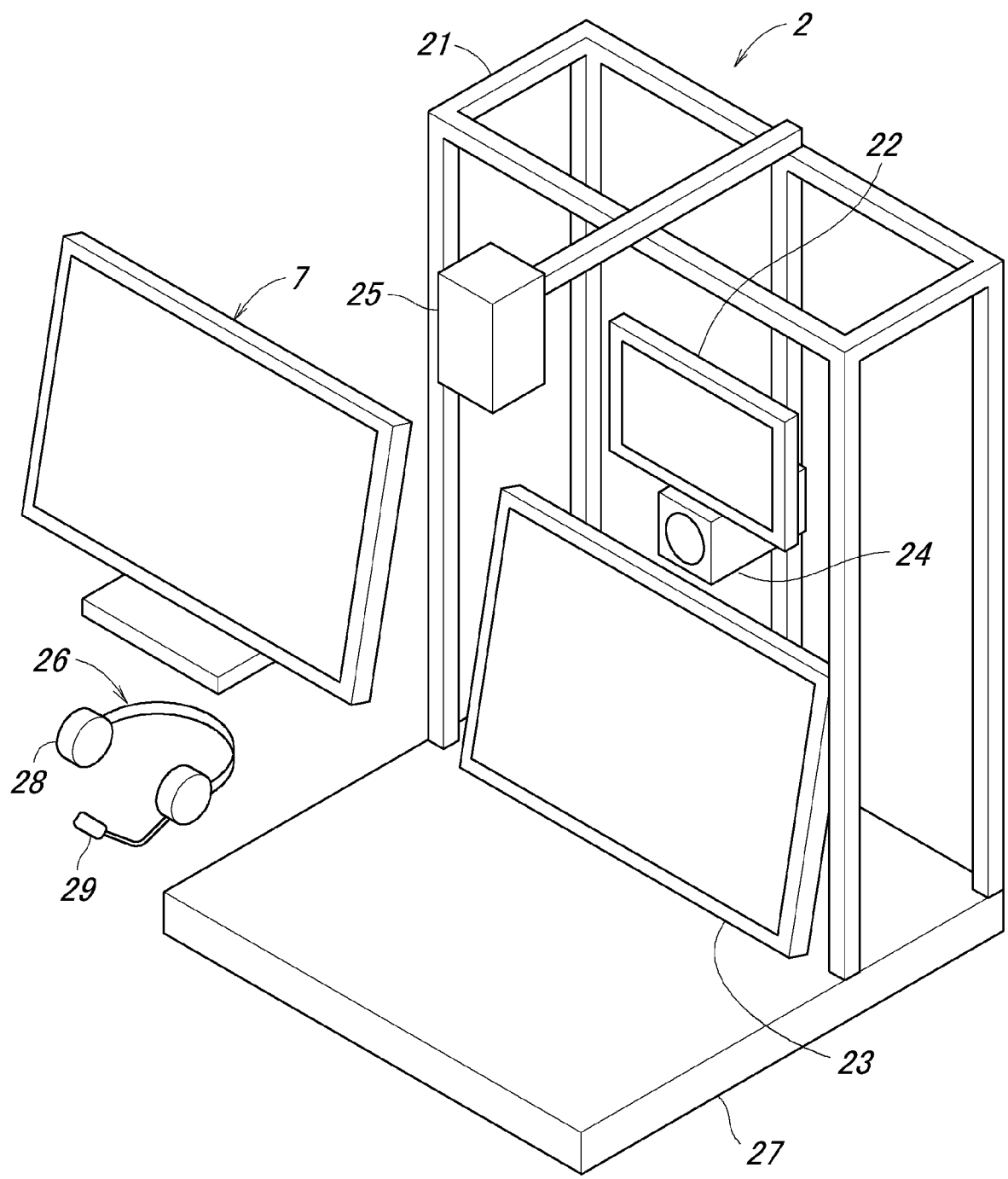
FIG. 3 is a perspective view showing an operator terminal 2.

Next, the operator terminal 2 will be described. FIG. 3 is a perspective view showing an operator terminal 2.

The operator terminal 2 includes a frame 21, a first monitor 22, a second monitor 23, a front-facing camera 24, a downward-facing camera 25, a headset 26, and a table 27.

The first monitor 22 is supported by the frame 21 so as to be located at a predetermined height. The second monitor 23 includes a touchscreen so that an operator can operate the touchscreen to invoke actions.

The front-facing camera 24 is used to shoot an operator's upper body including the face from front. The downward-facing camera 25 is used to shoot a video of where the operator's hands can be placed; that is, shoot a video of the operator's hand placed on the table 27 from above. The operator, putting a document such as a brochure on the table, explains the document while pointing a finger on the document, and this situation is shot by the downward-facing camera 25.

The headset 26 includes a speaker 28 and a microphone 29. The speaker 28 outputs voice of the user. The microphone 29 picks up a sound of the operator's voice.

The operator terminal 2 is also provided with a monitor 7. The monitor 7 displays a screen of an application running on the operator terminal 2 or a PC (not shown). The operator terminal 2 shares the screen of the application with the kiosk terminal 1 so that the same screen is displayed on the upward-facing monitor 13 of the kiosk terminal 1 (screen sharing function). The monitor 7 includes a touchscreen, and an operator can draw on the screen by handwriting (whiteboard function).

In a call center, each of the operators uses the operator terminal 2 not only to provide face-to-face services to a user through video and voice, but also to provide telephone reception services by responding to a user only by voice over the telephone. Thus, the operator terminal 2 is also equipped with a monitor (not shown) for telephone reception services.

Figure 4:
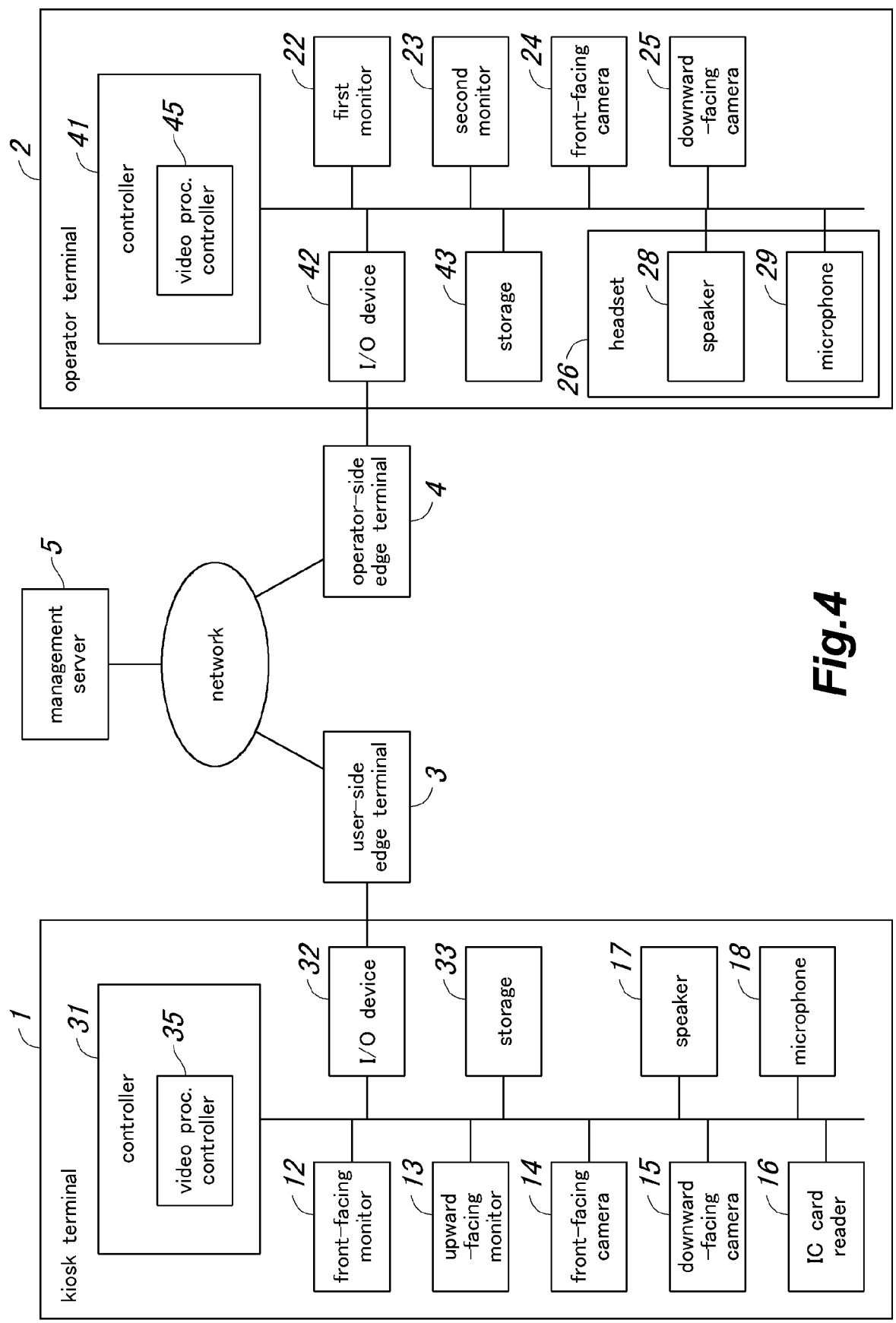
FIG. 4 is a block diagram showing schematic configurations of the kiosk terminal 1 and the operator terminal 2.

Next, schematic configurations of the kiosk terminal 1 and the operator terminal 2 will be described. FIG. 4 is a block diagram showing schematic configurations of the kiosk terminal 1 and the operator terminal 2.

As described above, the kiosk terminal 1 includes the front-facing monitor 12, the upward-facing monitor 13, the front-facing camera 14, the downward-facing camera 15, the IC card reader 16, the speaker 17, and the microphone 18. The kiosk terminal 1 also includes a controller 31, an I/O device 32, and a storage 33.

The I/O device 32 communicates data to and from the user-side edge terminal 3 via a network.

The storage 33 stores programs executable by a processor, which implements the controller 31.

The controller 31 includes a video processing controller 35. The controller 31 is configured by the processor, which executes a program stored in the storage 33 to thereby implement the video processing controller 35.

The video processing controller 35 encodes a frontal video of the user shot by the front-facing camera 14 and a video of hands of the user shot by the downward-facing camera 15. More specifically, the video processing controller 35 encodes the videos at a bit rate which is specified by a rate control operation performed by the user-side edge terminal 3. The video processing controller 35 also decodes a frontal vide of the operator and a video of hands of the operator provided from the user-side edge terminal 3.

As described above, the operator terminal 2 includes the first monitor 22, the second monitor 23, the front-facing camera 24, the downward-facing camera 25, and the headset 26. The operator terminal 2 also includes a controller 41, an I/O device 42, and a storage 43.

The I/O device 42 communicates data to and from the operator-side edge terminal 4 via the network.

The storage 43 stores programs executable by a processor, which implements the controller 41.

The controller 41 includes a video processing controller 45. The controller 41 is configured by the processor, which executes a program stored in the storage 43 to thereby implement the video processing controller 45.

The video processing controller 45 encodes a frontal video of the operator shot by the front-facing camera 24 and a video of hands of the operator shot by the downward-facing camera 25. More specifically, the video processing controller 45 encodes the videos at a bit rate which is specified by a rate control operation performed by the operator-side edge terminal 4. The video processing controller 45 also decodes a frontal vide of the user and a video of hands of the user provided from the operator-side edge terminal 4.

It should be noted that the operator terminal 2 may be provided with a scanner used for scanning a document(s) an operator has. In addition, the operator terminal 2 may be provided with an IC card reader used to authenticate an operator who operates the terminal as an authorized operator. Moreover, the kiosk terminal 1 may be provided with a printer used to print out a document transmitted from the operator terminal 2 or information displayed on the screen.

The second monitor 23 may be configured by a tablet PC; that is, configured such that the controller 41, the I/O device 42, and the storage 43 are accommodated in a housing of the second monitor 23.

Figure 5:
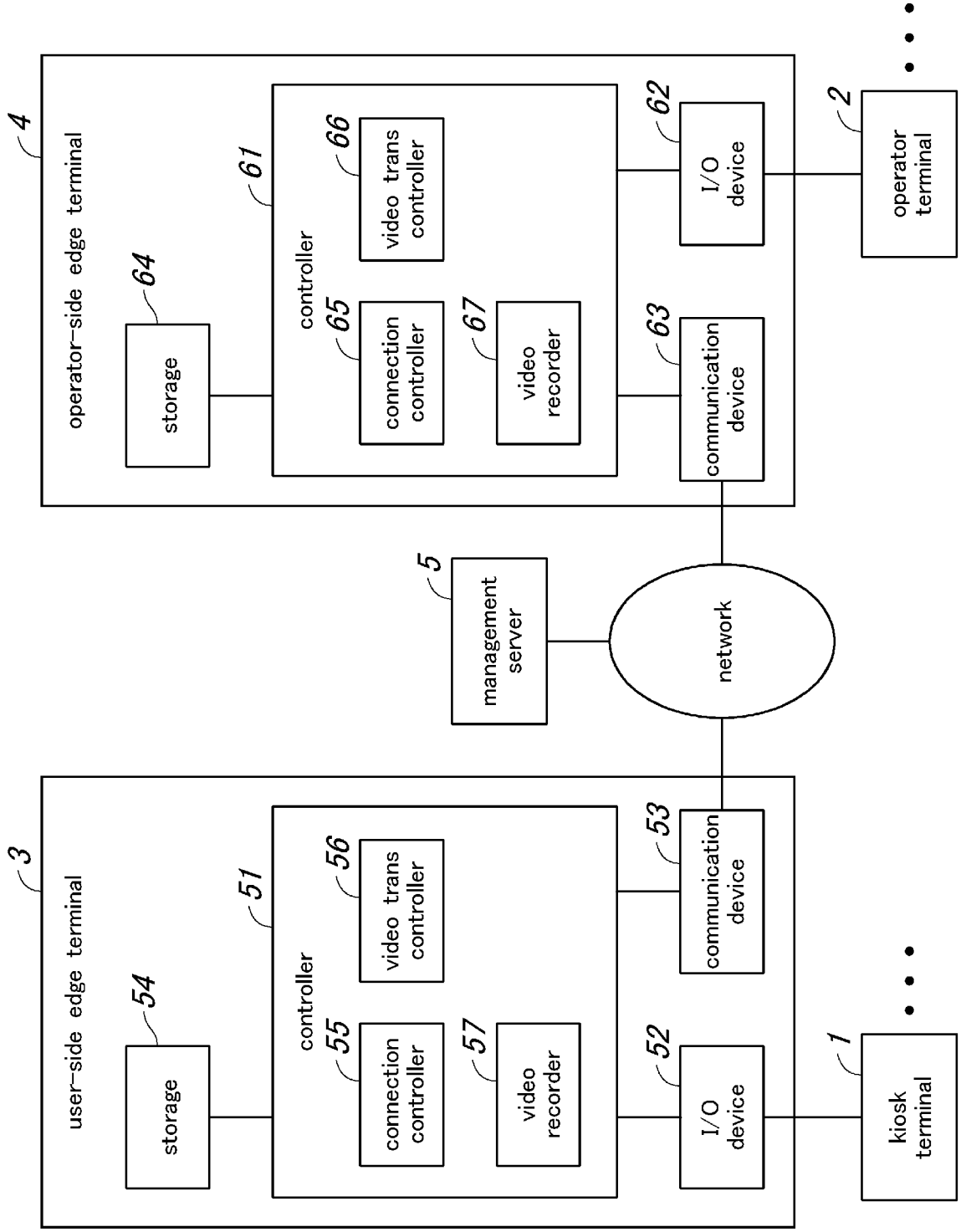
FIG. 5 is a block diagram showing schematic configurations of a user-side edge terminal 3 and an operator-side edge terminal 4.

Next, schematic configurations of the user-side edge terminal 3 and the operator-side edge terminal 4 will be described. FIG. 5 is a block diagram showing schematic configurations of the user-side edge terminal 3 and the operator-side edge terminal 4.

The user-side edge terminal 3 includes a controller 51, an I/O device 52, a communication device 53, and a storage 54.

The I/O device 52 communicates data to and from the kiosk terminals 1. A plurality of kiosk terminals can be connected to the I/O device 52.

The communication device 53 performs communication with the operator-side edge terminal 4 and the management server 5 via a network.

The storage 54 stores programs executable by a processor, which implements the controller 51.

The controller 51 includes a connection controller 55, a video transmission controller 56, and a video recorder 57. The controller 51 is configured by a processor, and each unit of the controller 51 is implemented by executing a program stored in the storage 54 by the processor.

The connection controller 55 acquires connection information associated with the operator-side edge terminal 4 from the management server 5 and performs a connection control for connection to the operator-side edge terminal 4.

The video transmission controller 56 performs a control for real-time, simultaneous transmission of a frontal vide of the user and a video of hands of the user, which are provided from each kiosk terminal 1. Specifically, the video transmission controller 56 performs a bandwidth estimation for estimating an available bandwidth for communication between the user-side edge terminal 3 and the operator-side edge terminal 4, and also performs a transmission rate control for controlling a transmission rate, at which the frontal video of the user and the video of the user's hands are transmitted, depending on the estimated available bandwidth. The bandwidth estimation and the transmission rate control are critical for cases of transmission via the Internet.

The video recorder 57 records the video data received from the operator-side edge terminal 4 in the storage 54. As a result, the load on the kiosk terminal 1 can be reduced.

The operator-side edge terminal 4 includes a controller 61, an I/O device 62, a communication device 63, and a storage 64.

The I/O device 62 communicates data to and from the operator terminals 2. A plurality of operator terminals can be connected to the I/O device 62.

The communication device 63 performs communication with the user-side edge terminal 3 and the management server 5 via the network.

The storage 64 stores programs executable by a processor, which implements the controller 61.

The controller 61 includes a connection controller 65, a video transmission controller 66, and a video recorder 67. The controller 61 is configured by a processor, and each unit of the controller 61 is implemented by executing a program stored in the storage 64 by the processor.

The connection controller 65 acquires connection information associated with the user-side edge terminal 3 from the management server 5 and performs a connection control for connection to the user-side edge terminal 3.

The video transmission controller 66 performs a control for real-time, simultaneous transmission of a frontal vide of the user and a video of hands of the user, which are provided from each operator terminal 2. Specifically, the video transmission controller 66 performs a bandwidth estimation for estimating an available bandwidth for communication between the user-side edge terminal 3 and the operator-side edge terminal 4, and also performs a transmission rate control for controlling a transmission rate, at which the frontal video of the operator and the video of the operator's hands, depending on the estimated available bandwidth.

The video recorder 67 records the video data received from the user-side edge terminal 3 in the storage 64. As a result, the load on the operator terminal 2 can be reduced.

Next, screens displayed on the kiosk terminal 1 will be described. FIG. 6 is an explanatory diagram showing the screens displayed on the kiosk terminal 1.

In the kiosk terminal 1, the front-facing monitor 12 operates as digital signage during standby (before connecting to the operator terminal 2), and as shown in FIG. 6(A-1), the kiosk terminal 1 displays on the front-facing monitor 12 video contents relating to advertisements such as recommended plans and guide maps of facilities.

Also, during standby, as shown in FIG. 6(A-2), a menu screen (operation screen) is displayed on the upward-facing monitor 13. The menu screen includes displayed operation buttons 71 corresponding to various menu items. The menu screen also includes a call button 72. When the user operates the call button 72, the kiosk terminal 1 makes a connection to the operator terminal 2 so that the kiosk terminal 1 can start interaction with the operator. The controller 31 may be configured such that, when a sensor such as a human sensor detects the user in front of the kiosk terminal 1, the controller 31 automatically launches the menu screen, and when the kiosk terminal 1 is continuously in a non-use state for a predetermined period of time, the controller 31 shifts the screen from the menu screen to a screen in non-displayed state.

When the front-facing monitor 12 operates as digital signage, the kiosk terminal 1 may read data of video contents pre-stored in the storage 33 in order to reproduce the video contents. In this case, the kiosk terminal 1 may be configured such that a memory card storing video contents data is be attached to the kiosk terminal 1, or the video contents data is distributed from a distribution server to the kiosk terminal 1 via the network.

When the kiosk terminal 1 is connected to the operator terminal 2, the front-facing monitor 12 displays a frontal video 73 of the operator shot by the front-facing camera 24 of the operator terminal 2 as shown in FIG. 6(B-1), and simultaneously, the upward-facing monitor 13 displays a video 74 of the operator's hand shot by downward-facing camera 25 of the operator terminal 2 as shown in FIG. 6(B-2).

The front-facing monitor 12 displays the frontal video 73 of the operator so that the height of the eyes of the user matches that of the operator, whereas the upward-facing monitor 13 displays a video 74 of the operator's hands so that the height of the user matches that of the operator. As a result, the user can experience a realistic sensation that the user faces the operator over the counter.

The video 74 of the operator's hands displayed on the upward-facing monitor 13 shows a situation in which the operator makes an explanation, pointing a finger on a document such as a brochure, so that the user and the operator can interact with each other while pointing their fingers on the document.

The operator can perform an operation on the operator terminal so that the upward-facing monitor 13 of the kiosk terminal 1 displays a screen of an application. The kiosk terminal 1 shares the screen of the application with the operator terminal 2 so that the same screen is displayed on the operator terminal 2 (screen sharing function). Also, the user can draw on the screen of the application by handwriting (whiteboard function).

The kiosk terminal 1 may be configured such that the front-facing monitor 12 displays a frontal video of the operator with the operator's background masked.

Figure 7:
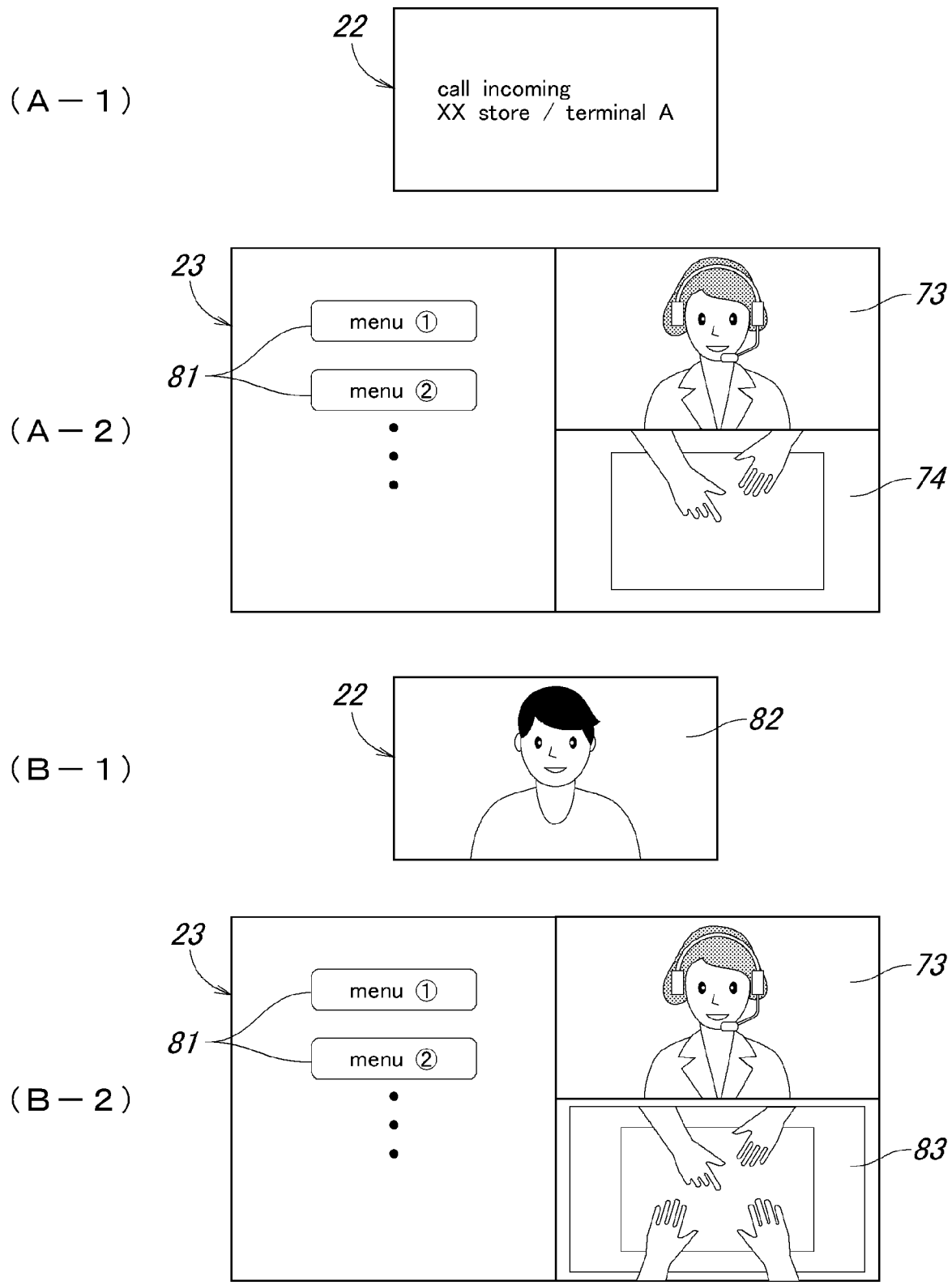
FIG. 7 is an explanatory diagram showing screens displayed on the operator terminal 2.

Next, screens displayed on the operator terminal 2 will be described. FIG. 7 is an explanatory diagram showing the screens displayed on the operator terminal 2.

During standby, the first monitor 22 of the operator terminal 2 displays a standby screen, and when the user operates the call button 72 (see FIG. 6(A-2)), a call incoming screen as shown in FIG. 7(A-1) is displayed on the first monitor 22. The call incoming screen shows information on the counterpart kiosk terminal 1 (such as disposed location or terminal name).

During standby, an operation screen as shown in FIG. 7(A-2) is displayed on the second monitor 23 of the operator terminal 2. The operation screen shows operation buttons 81 corresponding to various menu items such as those used to control the operator terminal 2 and give instructions to the kiosk terminal 1.

The second monitor 23 displays the frontal video 73 of the operator shot by the front-facing camera 24 of the operator terminal 2 and the video 74 of the operator's hands shot by downward-facing camera 25 of the operator terminal 2, which are both same as those displayed on the kiosk terminal 1. The video 74 of the operator's hands can be switched between the video displayed in the original form and that in a vertically flipped form.

When the operator terminal 2 is connected to the kiosk terminal 1, the first monitor 22 displays a frontal video 82 of the user shot by the front-facing camera 14 of the kiosk terminal 1 as shown in FIG. 7(B-1). The first monitor 22 is supported by the frame 21 so as to be located at a predetermined height (see FIG. 3), which allows the height of the operator's eyes to match that of the user's eyes.

As shown in FIG. 7(B-2), the second monitor 23 displays the operation buttons 81 in the same manner as during standby. The second monitor 23 also displays the frontal video 73 of the operator in the same manner as during standby. The screen displayed on the second monitor can be switched between the frontal video 73 of the operator and the video of the operator's hands. The second monitor 23 displays a video 83 of the user's hands shot by the downward-facing camera 15 of the kiosk terminal 1 concurrently with displaying the video of the operator's hands. The video 83 of the user's hands can be switched between the video displayed in the original form and that in a vertically flipped form.

The video 83 of the user's hands displayed on the second monitor 23 shows a situation in which the user points a finger on a document such as a brochure on the upward-facing monitor 13 of the kiosk terminal 1, so that the user and the operator can interact with each other while pointing their fingers on the document.

In the present embodiment, the operator terminal 2 is configured such that the first monitor 22 displays the frontal video 82 of the user, and the second monitor 23 displays the video 83 of the user's hands. However, the operator terminal 2 may be configured such that a single monitor displays the user's frontal video 82 and the video 83 of the user's hands. In this case, the operator can experience a realistic sensation that the operator faces the user over the counter.

Next, operation procedure of operations performed by the system will be described. FIG. 8 is a sequence diagram showing an operation procedure of operations performed by the system.

When a user operates the call button 72 (see FIG. 6(A-2)) on the kiosk terminal 1, the kiosk terminal 1 outputs a call instruction (connection request) from the terminal 1. When the user-side edge terminal 3 receives the call instruction from the kiosk terminal 1, the user-side edge terminal 3 transmits to the management server 5 an inquiry about connection information associated with the operator-side edge terminal 4, which is to be a connection destination, and when the user-side edge terminal 3 acquires the connection information provided from the management server 5 as a response to the inquiry, the user-side edge terminal 3 performs an operation to connect to the operator-side edge terminal 4 based on the acquired connection information.

Next, the user-side edge terminal 3 performs a bandwidth estimation for estimating an available bandwidth for communication between the user-side edge terminal 3 and the operator-side edge terminal 4, and also performs a transmission rate control for controlling a transmission rate, at which the user's frontal video and the video of the user's hands are transmitted, depending on the estimated available bandwidth.

The kiosk terminal 1 starts transmitting a video stream; that is, transmitting video data at the transmission rate designated by the user-side edge terminal 3. Specifically, the kiosk terminal 1 encodes video signals of the frontal video of the user and the video of the user's hands, which are provided from the front-facing camera 14 and the downward-facing camera 15, respectively, and then outputs respective video data (including audio) of the frontal video of the user and the video of the user's hands to the user-side edge terminal 3.

The user-side edge terminal 3 transmits the video data of the frontal video of user and the video of user's hands provided from the kiosk terminal 1 to the operator-side edge terminal 4.

When receiving the respective video data of the frontal video of user and the video of user's hands transmitted from the user-side edge terminal 3, the operator-side edge terminal 4 outputs the video data to the operator terminal 2. The operator-side edge terminal 4 also records the received video data in the storage 64.

Then, the operator terminal 2 decodes the video data provided from the operator-side edge terminal 4, and displays the frontal video of the user and the video of the user's hands on the first monitor 22 and the second monitor 23, respectively.

In addition, the operator-side edge terminal 4 performs a bandwidth estimation for estimating an available bandwidth for communication between the user-side edge terminal 3 and the operator-side edge terminal 4, and also performs a transmission rate control for controlling a transmission rate, at which the operator's frontal video and the video of the operator's hands are transmitted, depending on the estimated available bandwidth.

The operator terminal 2 starts transmitting a video stream; that is, transmitting video data at the transmission rate designated by the operator-side edge terminal 4. Specifically, the operator terminal 2 encodes video signals of the frontal video of the operator and the video of the operator's hands, which are provided from the front-facing camera 24 and the downward-facing camera 25, respectively, and then outputs respective video data (including audio) of the frontal video of the operator and the video of the operator's hands to the operator-side edge terminal 4.

The operator-side edge terminal 4 transmits the video data of the frontal video of operator and the video of operator's hands provided from the operator terminal 2 to the user-side edge terminal 3.

When receiving the respective video data of the frontal video of user and the video of user's hands transmitted from the operator-side edge terminal 4, the user-side edge terminal 3 outputs the video data to the kiosk terminal 1. The user-side edge terminal 3 also records the received video data in the storage 54.

Then, the kiosk terminal 1 decodes the video data provided from the user-side edge terminal 3, and displays the frontal video of the operator and the video of the operator's hands on the front-facing monitor 12 and the upward-facing monitor 13, respectively.

Furthermore, when the user performs a termination operation on the kiosk terminal 1, the kiosk terminal 1 outputs a disconnection instruction, and the user-side edge terminal 3 performs a disconnection operation for disconnecting the connection to the operator-side edge terminal 4.

In FIG. 8, in response to the user's operation of the call button, the kiosk terminal 1 outputs a call instruction to thereby cause the user-side edge terminal 3 to connect to the operator-side edge terminal 4. However, the operator terminal 2 can also output a call instruction so as to cause the operator-side edge terminal 4 to connect to the user-side edge terminal 3.

Moreover, the kiosk terminal 1 and the operator terminal 2 transmit and receive to and from each other, in addition to the videos, operation information as to what the user and the operator have operated on the kiosk terminal 1 and the operator terminal 2, respectively, and text information entered by the user and the operator.

In the present embodiment, the kiosk terminal 1 and the operator terminal 2 encode and decode video signals. However, the system may be configured such that the video transmission controller 56 of the user-side edge terminal 3 and the video transmission controller 66 of the operator-side edge terminal 4 encode and decode video signals.

The user-side edge terminal 3 and the operator-side edge terminal 4 may perform image recognition such as face detection.

In the present embodiment, the kiosk terminal 1 is connected to the user-side edge terminal 3 and the operator terminal 2 is connected to the operator-side edge terminal 4, and the user-side edge terminal 3 and the operator-side edge terminal 4 communicate with each other via the network. However, the system may be configured such that a kiosk terminal is dedicated to bidirectional communication and has the function of the user-side edge terminal 3 and/or the operator terminal 2 is dedicated to bidirectional communication and has the function of the operator-side edge terminal 4 so that either one of the user-side edge terminal 3 and the operator-side edge terminal 4 can be omitted.

While specific embodiments of the present invention are described herein for illustrative purposes, the present invention is not limited to the specific embodiments. It will be understood that various changes, substitutions, additions, and omissions may be made for elements of the embodiments without departing from the scope of the invention. In addition, elements and features of the different embodiments may be combined with each other as appropriate to yield an embodiment which is within the scope of the present invention.

INDUSTRIAL APPLICABILITY

A bidirectional video communication system and an operator terminal according to the present invention achieve an effect of allowing a generally-used operator terminal for providing telephone reception services through responding to a user only using voice over a telephone, to be made also usable for providing face-to-face reception services through responding to the user using video and voice, and are useful as a bidirectional video communication system for communication between a kiosk terminal and an operator terminal, the system being configured to bidirectionally transmit a video of a user who operates the kiosk terminal and a video of an operator who operates the operator terminal between the kiosk terminal and the operator terminal, a communication control device connected to an operator terminal and a communication control device connected to a kiosk terminal.

GLOSSARY 1 kiosk terminal
2 operator terminal
3 user-side edge terminal
4 operator-side edge terminal
5 management server
12 front-facing monitor
13 upward-facing monitor
14 front-facing camera
15 downward-facing camera
17 speaker
18 microphone
22 first monitor
23 second monitor
24 front-facing camera
25 downward-facing camera
26 headset
28 speaker
29 microphone
31 controller
32 communication device
33 storage
41 controller
42 communication device
43 storage
53 operator's front face video
54 operator's hand viewing video
61 controller
62 I/O device
63 communication device
64 storage
73 frontal video
74 video of operator's hands
82 user's frontal-face video
83 video of user's hands

The invention claimed is:

1. A bidirectional video communication system configured to bidirectionally transmit a video of a user who operates a kiosk terminal and a video of an operator who operates an operator terminal between the kiosk terminal and the operator terminal for providing face-to-face response services to the user, the bidirectional video communication system comprising:
an operator-side system configured to provide the face-to-face response services to users, the operator-side system comprising:
a plurality of operator terminals configured to provide telephone reception services when in a used state, and to provide video services when in a non-used state; and
an operator-side communication control device configured to:
when the operator terminal, among the plurality of operator terminals, is in the non-used state, connect to the operator terminal, the non-used state being a state in which the operator terminal is not being used for the telephone reception services, and when the operator terminal, among the plurality of operator terminals, is in the used state, not connecting to the operator terminal, the used state being a state in which the operator terminal is being used for the telephone reception services; and
wherein the operator-side communication control device of the operator-side terminal comprises:
an I/O device configured for performing input and output of data to and from the operator terminal;
a communication device for communicating with the kiosk terminal or a user-side communication control device connected to the kiosk terminal via a network; and
a controller,
configured to perform a connection control for connection to the kiosk terminal or the user-side communication control device and to perform a video transmission control of real-time transmission of a frontal video of the operator and a video of hands of the operator to the kiosk terminal or the user-side communication control device, and receive a frontal video of the user and a video of hands of the user from the kiosk terminal or the user-side communication control device,
wherein the frontal video of the operator and the video of hands of the operator are shot by the operator terminal, and
wherein the frontal video of the user and the video of hands of the user are shot by the kiosk terminal.

2. The bidirectional video communication system according to claim 1, wherein the operator-side communication control device performs a bandwidth estimation for estimating an available bandwidth for communication between the kiosk terminal and the user-side communication control device, and performs a transmission rate control for controlling a transmission rate depending on the estimated available bandwidth.

3. The bidirectional video communication system according to claim 1, further comprising:
a server device configured to manage connection information used for connecting the operator-side communication control device to the kiosk terminal and the user-side communication control device, and to provide the connection information to the operator-side communication control device,
wherein the operator-side communication control device is configured to acquire the connection information from the server device and perform the connection control.

4. A communication control device connected to an operator terminal and configured to bidirectionally transmit a video of a user who operates a kiosk terminal and a video of an operator who operates the operator terminal to and from the kiosk terminal configured to provide face-to-face response services to the user,
wherein the communication control device is configured to:
when, among a plurality of operator terminals used for providing telephone reception services when in a used state and providing video services in a non-used state, the operator terminal is in the non-used state, connect to the operator terminal, the non-used state being a state in which the operator terminal is not being used for the telephone reception services, and
when the operator terminal, among the plurality of operator terminals, is in the used state, not connect to the operator terminal, the used state being a state in which the operator terminal is being used for the telephone reception services, the communication control device comprising:

an I/O device configured for performing input and output of data to and from the operator terminal;

a communication device for communicating with the kiosk terminal or a user-side communication control device connected to the kiosk terminal via a network; and a controller, and wherein the controller is configured to perform a connection control for connection to the kiosk terminal or the user-side communication control device and to perform a video transmission control of real-time transmission of a frontal video of the operator and a video of hands of the operator, both videos being shot by the operator terminal, and a frontal video of the user and a video of hands of the user, both videos being shot by the kiosk terminal, to and from the kiosk terminal or the user-side communication control device.

* * * * *